W. N. BRIGGS.
SCALE ATTACHMENT.
APPLICATION FILED AUG. 9, 1911.
1,057,324.
Patented Mar. 25, 1913.
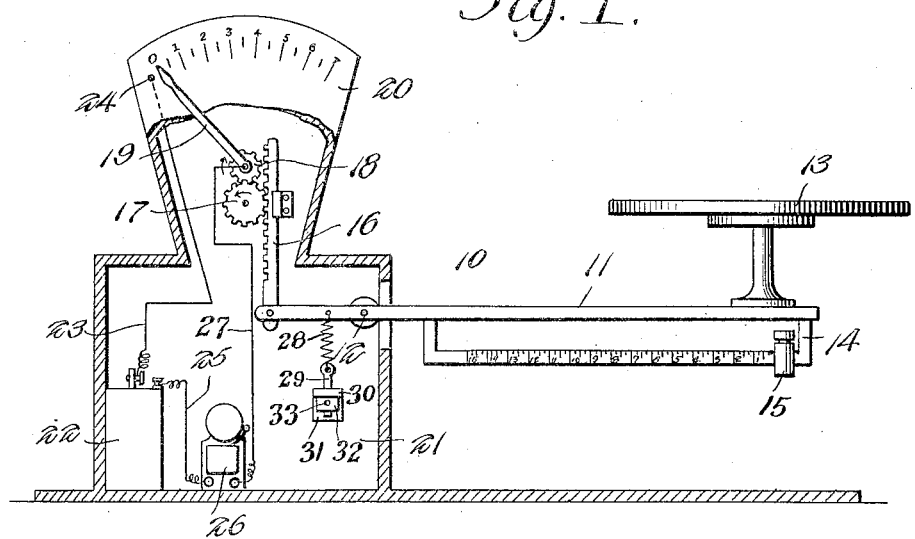
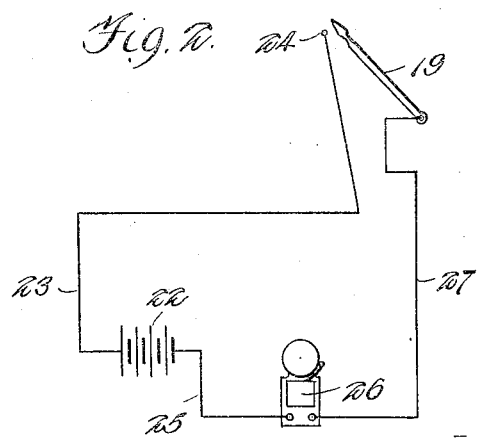
Witnesses
Hugh H. Ott.
P. H. Porter
Inventor
William N. Briggs
By Victor J. Evans
Attorney

UNITED STATES PATENT OFFICE.

WILLIAM N. BRIGGS, OF RALEIGH, TENNESSEE.

SCALE ATTACHMENT.

1,057,324.  Specification of Letters Patent.  Patented Mar. 25, 1913.

Application filed August 9, 1911. Serial No. 643,087.

*To all whom it may concern:*

Be it known that I, WILLIAM N. BRIGGS, a citizen of the United States, residing at Raleigh, in the county of Shelby and State of Tennessee, have invented new and useful Improvements in Scale Attachments, of which the following is a specification.

An object of the invention is to provide an attachment to weighing scales for preventing errors in the weighing of merchandise and the like.

My device more particularly embodies a structure in which the weigher is notified when, through carelessness or an oversight, the tare weight is shifted to a position on the scale beam, other than the normal or neutral position of the said weight.

To accomplish the desired result, use is made of an alarm, connected with an electric circuit, arranged to be closed by the weight indicator of the scale when the tare weight is out of normal position on the scale beam.

Reference is to be had to the accompanying drawings constituting a part of this specification, in which similar characters of reference denote corresponding parts in all the views, and in which—

Figure 1 is a fragmentary side elevation of the scale showing my device attached thereto, Fig. 2 is a diagrammatic view of the electrical circuit.

Referring more particularly to the views, I provide the usual scale 10 having a weight arm 11, pivotally mounted at 12 and provided with a receiving plate 13, a scale beam 14 being dependingly mounted on the weight arm 11 and having a tare weight 15 mounted to slide thereon. Pivotally mounted at one end of the weight arm 11 is a rack bar 16 adapted to operate a toothed wheel 17 in mesh with a toothed wheel 18 having an indicator 19 operable therewith, the said indicator being adapted to operate over a graduated scale 20 mounted on the frame 21 of the weighing scale 10, the mentioned scale 20 being adapted to indicate the weight of the material placed in a vessel arranged on the receiving plate 13.

Mounted within the frame 21 is a battery 22 provided with an electrical conductor 23 having connection with a pin 24 extended outwardly from the graduated scale 20, a trifle to the left of the zero mark on the graduated scale. A second electrical conductor 25 connects the battery 22 with a bell 26 and an electrical conductor 27 is connected to the bell 26 and to the indicator 19.

Now assuming that when the tare weight 15 is in its normal position, the indicator 19 is at zero of the graduated scale 20, when the tare weight for any reason is moved to the left of its normal position, the outer end of the weight arm will move upwardly, thus moving the rack bar 16 downwardly and through the medium of the wheels 17, 18, the indicator 19 will be moved to the left of the zero mark on the graduated scale 20 and contact with the pin 24, thus completing the electrical circuit and ringing the bell 26 to notify the weigher that the tare weight 15 is out of normal position. When the tare weight is replaced in normal position the indicator 19, through the medium of the weight arm 11, the rack bar 16 and the wheels 17, 18 will return to the zero mark, thus breaking the electrical circuit and silencing the bell 26.

In order to compensate for the structure carried by the weight arm 11 to the right of the pivotal connection of the weight arm at the point 12, together with the weight of the weight arm, a contractile spring 28 is secured to the weight arm to the left of the point of pivotal connection of the weight arm at the point 12, the lower end of the said spring being connected to an eye bolt 29 mounted to slidably extend through an opening in an extension 30 of an L-shaped plate 31 secured to the casing of the scale, the lower end of the eye bolt being threaded to receive a nut 32, preferably provided with an aperture 33 in which a suitable pointed tool can be inserted for the purpose of turning the nut 32 on the bolt 29, to increase or decrease the contractile action of the mentioned spring 28, thus compensating for the weight of the structure on the weight arm and also for the weight of the weight arm to the right of the pivotal point 12. It will thus be obvious that the weight of the material placed on the receiving plate 13 will be indicated by the indicator 19 operating over the scale 20.

Having thus fully described the invention, what I claim as new, is:—

In combination with a scale having an indicator and a tare weight, an alarm, a contact pin mounted on the scale to one side of the zero positioned indicator and an electrical circuit connecting the said alarm, the said indicator and the said contact pin so that when the tare weight is moved from normal position the indicator will engage the said contact pin and complete the said circuit to actuate the said alarm.

In testimony whereof I affix my signature in presence of two witnesses.

WILLIAM N. BRIGGS.

Witnesses:
GEO. B. GATES,
T. J. SCOTT.

Copies of this patent may be obtained for five cents each, by addressing the "Commissioner of Patents, Washington, D. C."